(12) United States Patent
Takehana (10) Patent No.: US 10,564,529 B2
(45) Date of Patent: Feb. 18, 2020

(54) PROJECTION LENS AND PROJECTOR

(71) Applicant: SEIKO EPSON CORPORATION, Tokyo (JP)

(72) Inventor: Naoto Takehana, Matsumoto (JP)

(73) Assignee: SEIKO EPSON CORPORATION, Tokyo (JP)

(*) Notice: Subject to any disclaimer, the term of this patent is extended or adjusted under 35 U.S.C. 154(b) by 0 days.

(21) Appl. No.: 16/260,280

(22) Filed: Jan. 29, 2019

(65) Prior Publication Data
US 2019/0235363 A1 Aug. 1, 2019

(30) Foreign Application Priority Data

Jan. 30, 2018 (JP) .................................. 2018-013832

(51) Int. Cl.
*G02B 7/02* (2006.01)
*G03B 21/14* (2006.01)
*G02B 9/64* (2006.01)

(52) U.S. Cl.
CPC ............ *G03B 21/142* (2013.01); *G02B 7/021* (2013.01); *G02B 7/025* (2013.01); *G02B 9/64* (2013.01)

(58) Field of Classification Search
CPC ....... G03B 21/142; G02B 7/021; G02B 7/023; G02B 7/10
USPC ........................ 353/100, 101; 359/823, 826
See application file for complete search history.

(56) References Cited

U.S. PATENT DOCUMENTS

2008/0273252 A1* 11/2008 Shimizu .................. G02B 7/10
359/699

FOREIGN PATENT DOCUMENTS

JP 2012-220915 A 11/2012

* cited by examiner

*Primary Examiner* — Ryan D Howard
(74) *Attorney, Agent, or Firm* — Oliff PLC (57) ABSTRACT

A projection lens includes a lens group holding tube including lenses on the side facing the inner circumference of the lens group holding tube, a cam tube that supports the lens group holding tube movably in the optical axis direction, and a guide tube that supports the cam tube rotatably around the optical axis. The lens group holding tube includes a guide pin that protrudes outward from the lens group holding tube. The cam tube has a cam hole which inclines with respect to the optical axis direction along the circumferential direction and through which the guide pin passes. The guide tube includes a guide groove which extends in the optical axis direction and into which the guide pin is so inserted as to pass through the inner circumference of the guide groove and a flange that protrudes outward.

6 Claims, 5 Drawing Sheets

PROJECTION LENS AND PROJECTOR

BACKGROUND

1. Technical Field

The present invention relates to a projection lens including a lens group holding tube that moves in the optical axis direction, and to a projector that projects an image displayed on an image display device via a projection lens.

2. Related Art

JP-A-2012-220915 describes a projection lens incorporated in a projector. The projection lens described in JP-A-2012-220915 includes a lens barrel and an attachment tubular member for fixing the lens barrel to a fixing portion of the projector. The lens barrel includes a plurality of lenses and a barrel that holds the lenses in such a way that the outer circumferences thereof are held. The attachment tubular member includes an annular plate portion, a tubular portion that extends forward in the projection direction (toward enlargement side) from the outer-circumferential-side end portion of the plate portion, and a flange that protrudes outward from the tubular portion. The plate portion is fixed to an end surface of the lens barrel that is the end surface on the rear (reduction side) in the projection direction. In the state in which the plate portion is fixed so that the attachment tubular member is attached to the lens barrel, the tubular portion is located on the side facing the outer circumference of the lens barrel.

In the projection lens described in JP-A-2012-220915, the attachment tubular member including the flange supports the lens barrel in the form of a cantilever. Therefore, when the projection lens is fixed to the fixing portion of the projector via the flange, and impact externally acts on the projection lens, a large load acts on the attachment tubular member and the attachment tubular member could therefore be broken. Further, in the projection lens described in JP-A-2012-220915, the attachment tubular member including the flange includes the tubular portion located on the side facing the outer circumference of the lens barrel, resulting in a problem of an increase in the radial size of the projection lens.

SUMMARY

An advantage of some aspects of the invention is to provide a projection lens that is resistant to external impact and prevents an increase in the radial size when fixed to a projector via a flange. Another advantage of some aspects of the invention is to provide a projector that projects an image via the projection lens.

A projection lens according to an aspect of the invention includes a lens group holding tube including one or more lenses on a side facing an inner circumference of the lens group holding tube, a cam tube that supports the lens group holding tube movably in a direction of an optical axis of the one or more lenses in such a way that an outer circumference of the lens group holding tube is supported, and a guide tube that supports the cam tube rotatably around the optical axis in such a way that an outer circumference of the cam tube is supported. The lens group holding tube includes a guide pin that protrudes outward from the lens group holding tube. The cam tube has a cam hole which inclines with respect to the optical axis direction along a circumferential direction and through which the guide pin passes. The guide tube includes a guide groove which extends in the optical axis direction and into which the guide pin is so inserted as to pass through an inner circumference of the guide groove and a flange that protrudes outward.

In the projection lens according to the aspect of the invention, a barrel that holds the one or more lenses includes the lens group holding tube, the cam tube, and the guide tube in the direction from the side facing the inner circumference of the barrel toward the outer circumference thereof. The barrel (guide tube) is directly provided with the flange. Therefore, when the projection lens is fixed to a frame or any other component of the projector via the flange, and impact externally acts on the projection lens, the barrel can receive the impact. The projection lens can therefore be more resistant to external impact than in a case where a member including the flange is provided separately from the barrel and the projection lens so configured that the member including the flange supports the barrel in the form of a cantilever is fixed to the frame or any other component of the projector. Further, since the barrel (guide tube) is directly provided with the flange, no member including the flange needs to be disposed on the side facing the outer circumference of the barrel. An increase in the radial size of the projection lens can therefore be avoided. Moreover, since no member including the flange needs to be provided separately from the barrel, the number of parts of the projection lens can be reduced.

In the aspect of the invention, it is desirable that the flange is provided on the guide tube and located in an intermediate position in the optical axis direction. The flange can therefore be readily provided in a position close to the center of gravity of the projection lens. When the position of the flange is close to the center of gravity of the projection lens, the projection lens, when it is fixed to the frame or any other component of the projector via the flange, is supported by the frame in a well-balanced manner.

In the aspect of the invention, it is desirable that the guide tube includes the guide groove in an inner circumferential surface thereof, and that the guide groove includes a penetration section that extends over part of the guide groove in the optical axis direction and passes through the guide groove in a radial direction. Adjusting the relative angular positions of the cam tube and the guide tube around the optical axis therefore allows the cam hole of the cam tube to communicate with the penetration section of the guide tube. Therefore, in the state in which the cam hole and the penetration section communicate with each other, the guide pin can be attached to the lens group holding tube, which is located on the side facing the inner circumference of the cam tube, from the side facing the outer circumference of the guide tube via the penetration section and the cam hole. Further, it is easy to achieve the state in which the guide pin attached to the lens group holding tube passes through the cam hole in the cam tube and is inserted into the guide groove in the guide tube.

In the aspect of the invention, it is desirable that the guide tube is a resin molded part, that the flange has a fixing hole that passes therethrough in the optical axis direction, that the flange and the penetration section are provided in different positions in the optical axis direction, and that the fixing hole and the penetration section are provided in different angular positions around the optical axis. It is therefore easy to fill a die with a resin to mold the guide tube. That is, to provide the flange of the guide tube with the fixing hole, which passes through the flange in the optical axis direction, the die needs to include a pin for forming the fixing hole, and a movable die for the fixing hole that is movable in the axial direction (axial direction of guide tube) needs to be provided. Further, to provide the guide tube with the penetration section, which passes through the guide tube in the radial direction, a protrusion for forming the penetration section needs to be provided, and a movable die for the penetration section that is movable in the radial direction needs to be provided. In this situation, providing the flange and the penetration section in different positions in the optical axis direction and providing the fixing hole and the penetration section in different angular positions around the optical axis can prevent interference between the movable die of the fixing hole and the movable die for the penetration section when the two dies are moved. The guide tube can therefore be readily molded.

A projector according to another aspect of the invention includes any of the projection lenses described above and a frame for supporting the projection lens, and the projection lens is fixed to the frame via the flange.

According to the aspect of the invention, the barrel of the projection lens formed of the lens group holding tube, the cam tube, and the guide tube is directly provided with the flange of the projection lens. Therefore, when the projection lens is fixed to the frame of the projector via the flange, and impact externally acts on the projection lens, the barrel can receive the impact. The projection lens can therefore be more resistant to external impact. Further, since the barrel (guide tube) is directly provided with the flange, no member including the flange needs to be disposed on the side facing the outer circumference of the barrel. An increase in the radial size of the projection lens can therefore be avoided. The space where the projection lens is disposed in the projector can therefore be reduced. The size of the projector can therefore be readily reduced. Moreover, since no member including the flange needs to be provided separately from the barrel, the number of parts of the projection lens can be reduced. The number of parts of the projector can therefore be reduced, whereby the cost required to manufacture the projector can be reduced.

BRIEF DESCRIPTION OF THE DRAWINGS

The invention will be described with reference to the accompanying drawings, wherein like numbers reference like elements.

DESCRIPTION OF EXEMPLARY
EMBODIMENTS

A projection lens and a projector according to an embodiment of the invention will be described below with reference to the drawings.

Projector

Figure 1:
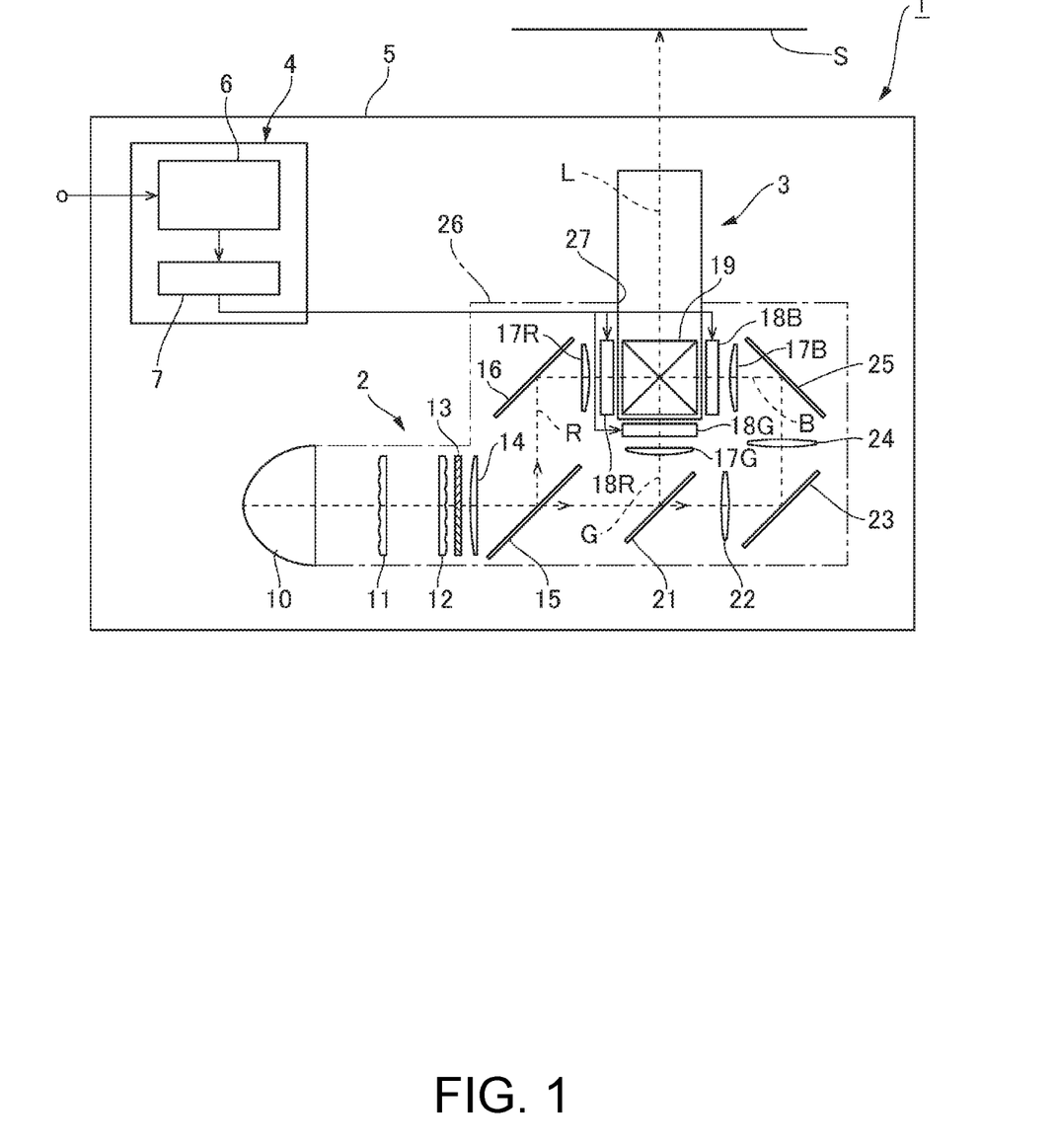
FIG. 1 is a schematic configuration diagram of a projector including a projection lens according to an embodiment of the invention.

FIG. 1 is a schematic configuration diagram of a projector including a projection lens according to the embodiment of the invention. A projector 1 includes an image light generation system 2, which generates image light to be projected on a screen S, a projection lens 3, which enlarges and projects the image light, and a controller 4, which controls the action of the image light generation system 2, as shown in FIG. 1. The projection lens 3, the image light generation system 2, and the controller 4 are accommodated in an enclosure 5.

Image Light Generation System and Controller

The image light generation system 2 includes a light source 10, a first optical integration lens 11, a second optical integration lens 12, a polarization conversion element 13, and a superimposing lens 14. The light source 10 is formed, for example, of an ultrahigh-pressure mercury lamp or a solid-state light source. The first optical integration lens 11 and the second optical integration lens 12 each include a plurality of lens elements arranged in an array. The first optical integration lens 11 divides the light flux from the light source 10 into a plurality of light fluxes. The lens elements of the first optical integration lens 11 each focus the light flux from the light source 10 in the vicinity of the corresponding lens element of the second optical integration lens 12.

The polarization conversion element 13 converts each of the light fluxes from the second optical integration lens into predetermined linearly polarized light. The superimposing lens 14 superimposes images of the lens elements of the first optical integration lens 11 on one another via the second optical integration lens 12 on a display area of each of liquid crystal panels 18R, 18G, and 18B, which will be described later.

The image light generation system 2 further includes a first dichroic mirror 15, a reflection mirror 16 and a field lens 17R, and the liquid crystal panel 18R. The first dichroic mirror 15 reflects R light, which is part of the light rays incident via the superimposing lens 14, and transmits G light and B light, which are part of the light rays incident via the superimposing lens 14. The R light reflected off the first dichroic mirror 15 travels via the reflection mirror 16 and the field lens 17R and enters the liquid crystal panel 18R. The liquid crystal panel 18R is an image display device. The liquid crystal panel 18R modulates the R light in accordance with an image signal to form a red image.

The image light generation system 2 further includes a second dichroic mirror 21, a field lens 17G, and the liquid crystal panel 18G. The second dichroic mirror 21 reflects the G light, which is part of the light rays incident via the first dichroic mirror 15, and transmits the B light, which is part of the light rays incident via the first dichroic mirror 15. The G light reflected off the second dichroic mirror 21 travels via the field lens 17G and enters the liquid crystal panel 18G. The liquid crystal panel 18G is an image display device. The liquid crystal panel 18G modulates the G light in accordance with an image signal to form a green image.

The image light generation system 2 further includes a relay lens 22, a reflection mirror 23, a relay lens 24, a reflection mirror 25, a field lens 17B, and the liquid crystal panel 18G. The B light having passed through the second dichroic mirror 21 travels via the relay lens 22, the reflection mirror 23, the relay lens 24, the reflection mirror 25, and the field lens 17B and enters the liquid crystal panel 18B. The liquid crystal panel 18B is an image display device. The liquid crystal panel 18B modulates the B light in accordance with an image signal to form a blue image.

The liquid crystal panels 18R, 18G, and 18B surround three sides of a cross dichroic prism 19. The cross dichroic prism 19 is a light combining prism and combines the light fluxes modulated by the liquid crystal panels 18R, 18G, and 18B with one another to generate image light.

The projection lens 3 enlarges the combined image light from the cross dichroic prism 19 (images formed by liquid crystal panels 18R, 18G, and 18B) and projects the enlarged image light on the screen S.

The projector 1 includes a frame 26, which accommodates the optical path of the light flux from the light source 10 and the optical members disposed along the optical path. The frame 26 has an opening 27 in the position corresponding to the optical path of the combined image light from the cross dichroic prism 19. The projection lens 3 is fixed to an opening edge portion of the opening 27 of the frame 26. The projection lens 3 will be described later in detail.

The controller 4 includes an image processor 6, to which an external image signal, such as a video signal, is inputted, and a display driver 7, which drives the liquid crystal panels 18R, 18G, and 18B based on an image signal outputted from the image processor 6.

The image processor 6 converts the image signal inputted from an external apparatus into image signals each containing grayscales and other factors of the corresponding color. The display driver 7 causes the liquid crystal panels 18R, 18G, and 18B to operate based on the color image signals outputted from the image processor 6. The image processor 6 thus causes the liquid crystal panels 18R, 18G, and 18B to display images corresponding to the image signals.

Projection Lens

Figure 2:
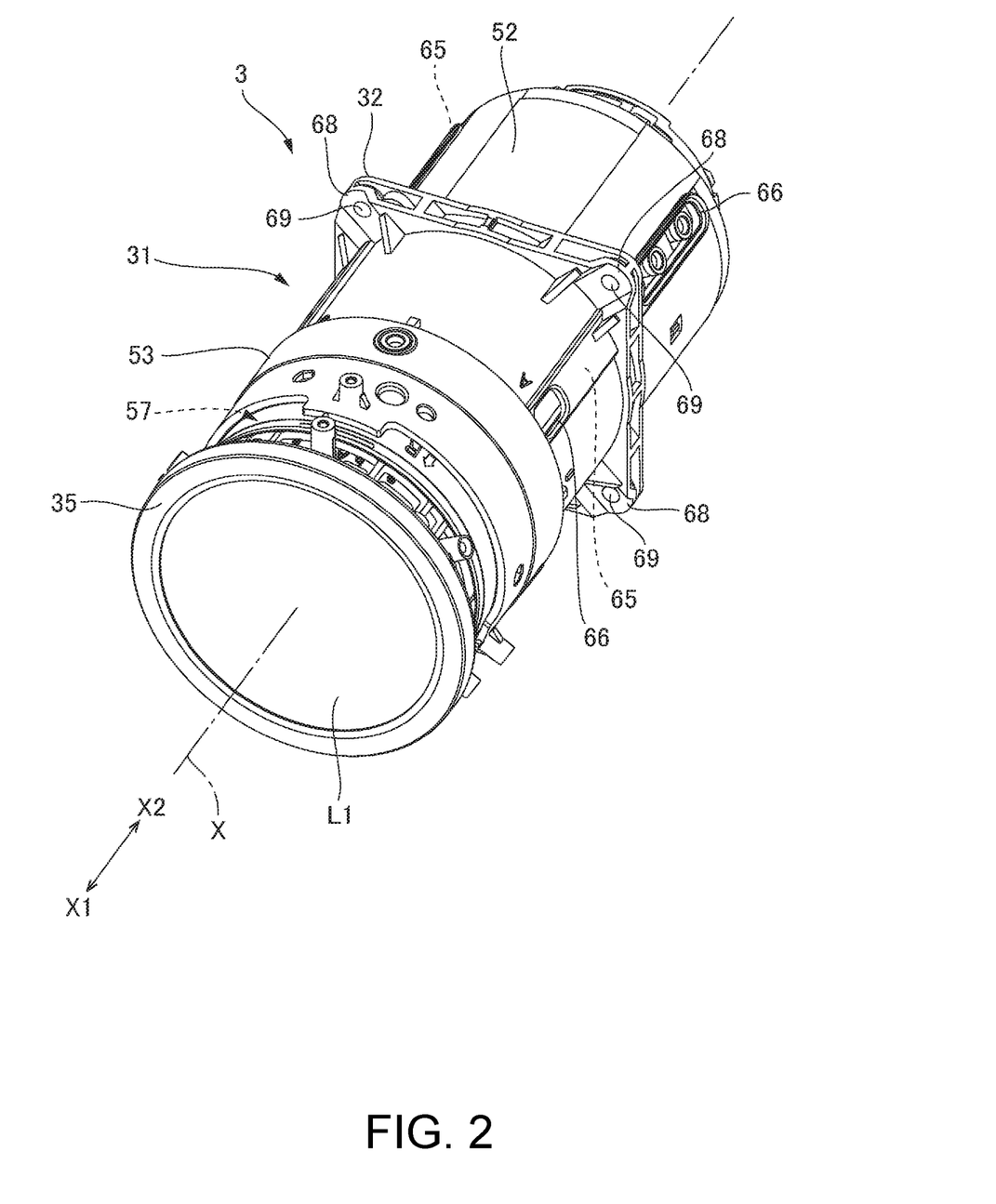
FIG. 2 is a perspective view of the projection lens viewed from the front side in a projection direction.
Figure 3:
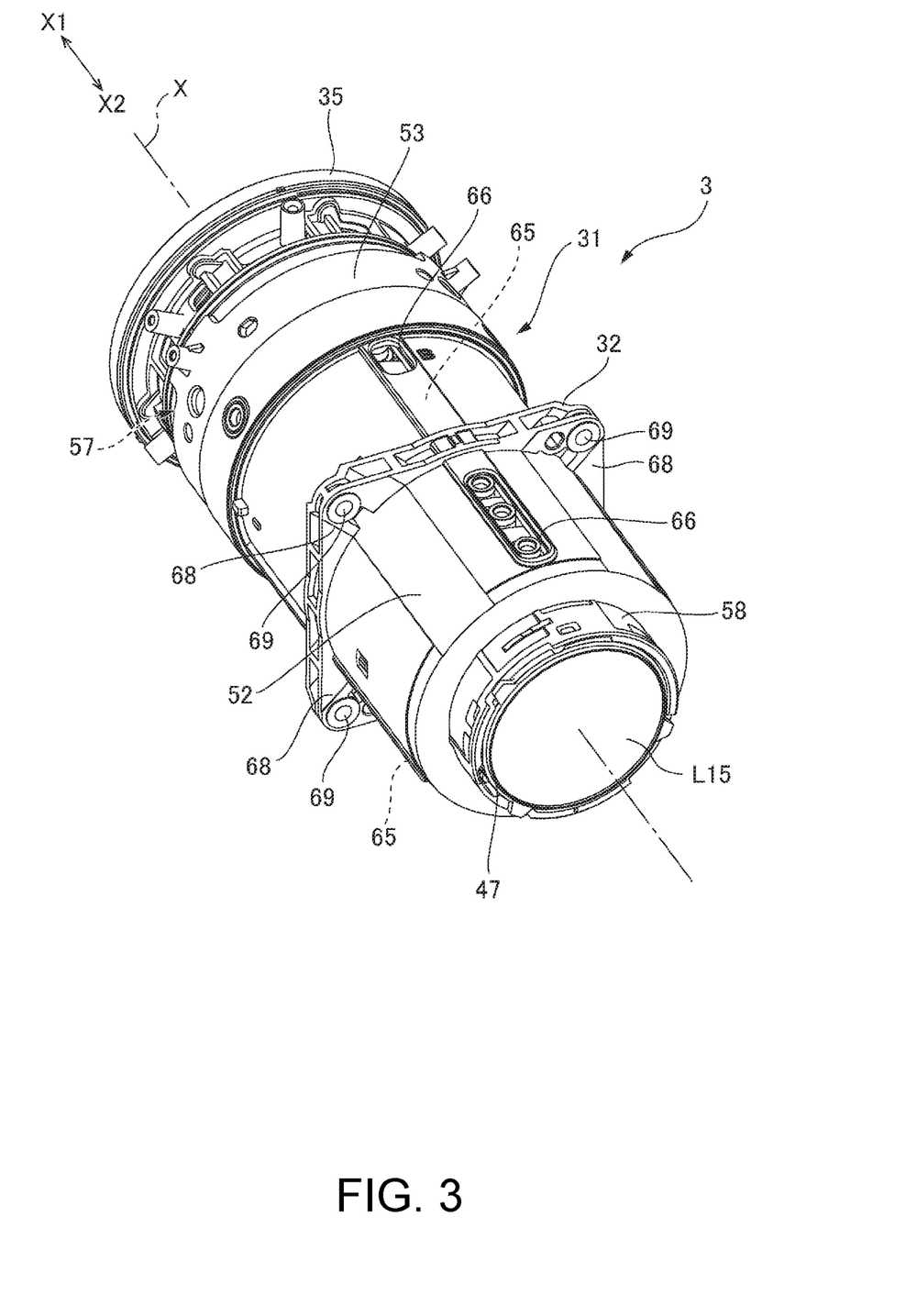
FIG. 3 is a perspective view of the projection lens viewed from the rear side in the projection direction.
Figure 4:
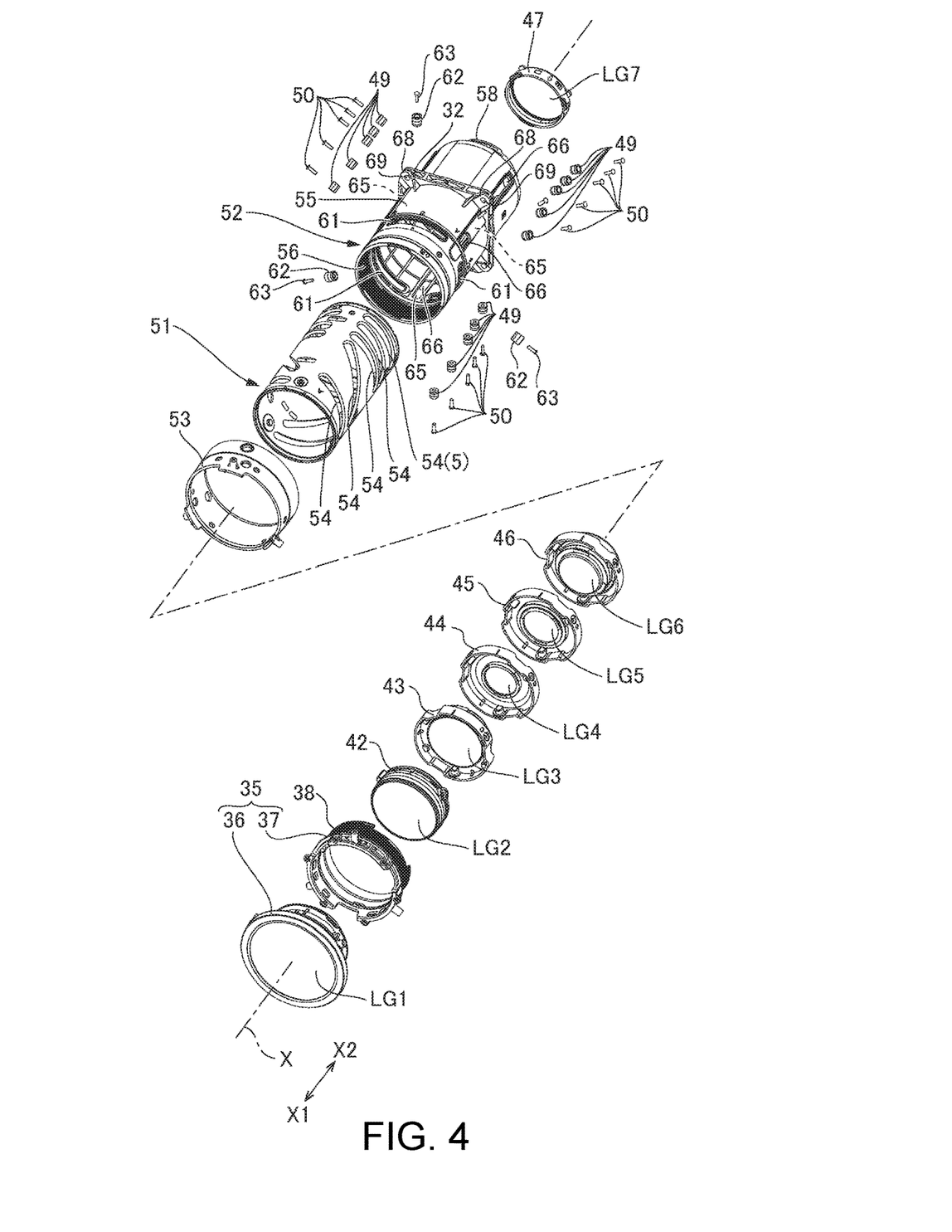
FIG. 4 is an exploded perspective view of the projection lens.
Figure 5:
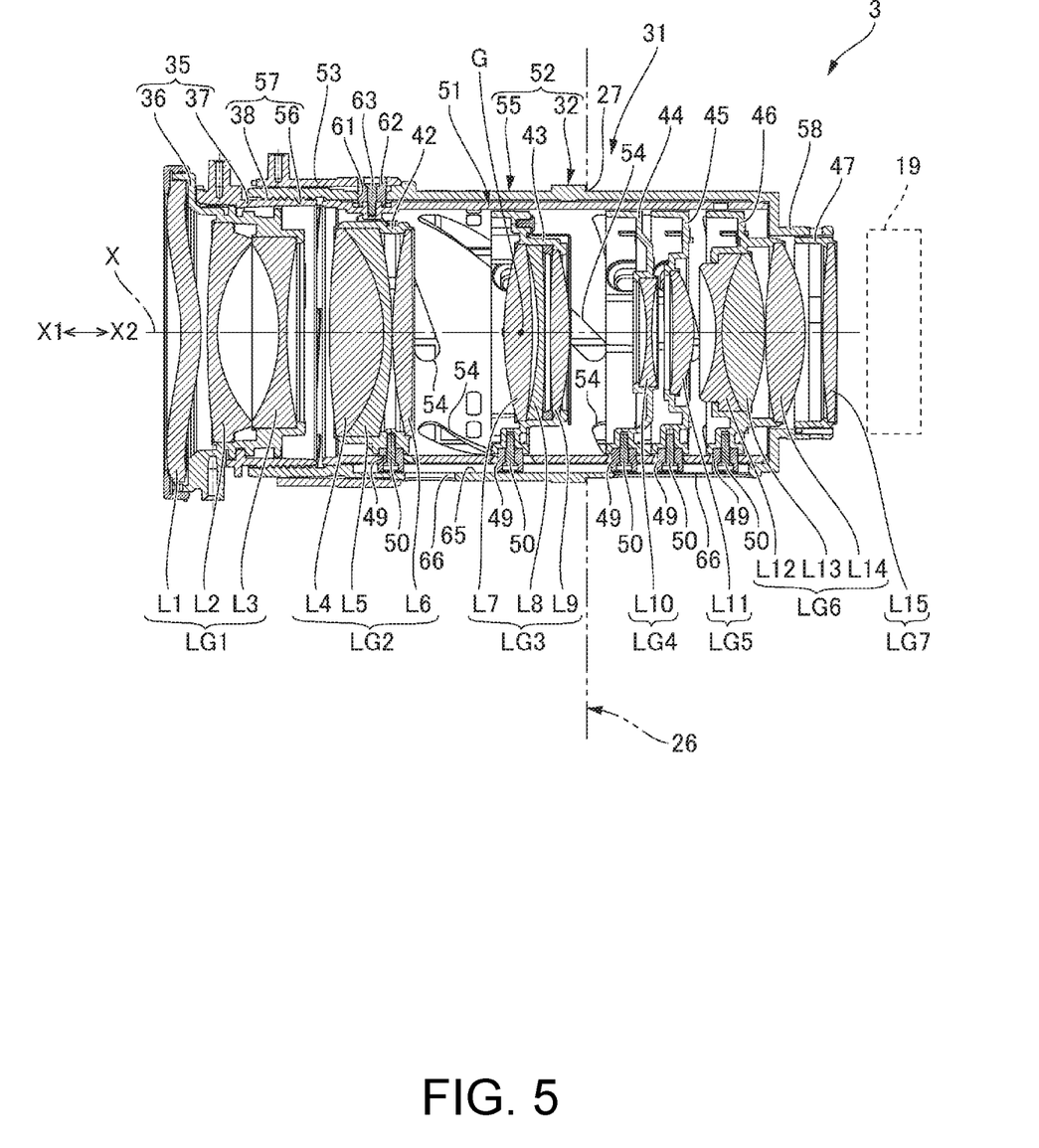
FIG. 5 is a cross-sectional view of the projection lens taken along the optical axis thereof.

FIG. 2 is a perspective view of the projection lens viewed from the front side (enlargement side) in the projection direction. FIG. 3 is a perspective view of the projection lens viewed from the rear side (reduction side) in the projection direction. FIG. 4 is an exploded perspective view of the projection lens in the present example. FIG. 5 is a cross-sectional view of the projection lens according to the embodiment of the invention taken along the optical axis. As shown in FIGS. 2 and 3, the projection lens 3 includes a plurality of lenses L1 to L15 and a barrel 31, which holds the lenses L1 to L15 in such a way that the outer circumferences thereof are held. The barrel 31 includes a flange 32, which is provided on the projection lens 3, located in an intermediate position in the optical axis direction X of the projection lens 3, and protrudes outward. In the following description, the opposite sides in the optical axis direction X of the projection lens 3 are defined as follows: The side facing the screen S (enlargement side) is called a front side X1 in the projection direction; and the side facing the cross dichroic prism 19 (reduction side) is called a rear side X2 in the projection direction. The direction perpendicular to the optical axis X is called a radial direction.

The projection lens 3 includes the 15 lenses L1 to L15, as shown in FIG. 5. The first lens L1, the second lens L2, and the third lens L3 form a first lens group LG1. The first lens group LG1 is held by a first lens group holding tube 35. The first lens group holding tube 35 includes a holding tube main body 36, which holds the first lens group LG1, and a support tube 37, which supports the holding tube main body 36 in such a way that the outer circumference of the holding tube main body 36 and the side thereof facing the rear side X2 are supported. The holding tube main body 36 is fixed to the support tube 37 via an adhesive. A rear-end portion of the outer circumferential surface of the support tube 37 is provided with a male thread 38.

The fourth lens L4, the fifth lens L5, and the sixth lens L6 form a second lens group LG2. The second lens group LG2 is held by a second lens group holding tube 42. The seventh lens L7, the eighth lens L8, and the ninth lens L9 form a third lens group LG3. The third lens group LG3 is held by a third lens group holding tube 43. The tenth lens L10 forms a fourth lens group LG4. The fourth lens group LG4 is held by a fourth lens group holding tube 44. The eleventh lens L11 forms a fifth lens group LG5. The fifth lens group LG5 is held by a fifth lens group holding tube 45. The twelfth lens L12, the thirteenth lens L13, and the fourteenth lens L14 form a sixth lens group LG6. The sixth lens group LG6 is held by a sixth lens group holding tube 46. The fifteenth lens L15 forms a seventh lens group LG7. The seventh lens group LG7 is held by a seventh lens group holding tube 47.

The second lens group LG2, the third lens group LG3, the fourth lens group LG4, the fifth lens group LG5, and the sixth lens group LG6 are each a movable lens group that moves in the optical axis direction X in zooming operation of changing the size of an image to be projected on the screen S. The second to sixth lens group holding tubes 42 to 46, which hold the movable lens groups, each include three guide pins 49, which protrude outward in the radial direction. The three guide pins 49 are attached to each of the lens group holding tubes 42 to 46 at equal angular intervals around the optical axis X. The guide pins 49 are each fixed to the lens group holding tubes 42 to 46 with a screw 50.

The barrel 31, which holds the lenses L1 to L15, includes the first to seventh lens group holding tubes 35 and 42 to 47, a cam tube 51, a guide tube 52, and a zooming ring 53. The cam tube 51 is located on the radially outer side of the second to sixth lens group holding tubes 42 to 46. The guide tube 52 is located on the side facing the outer circumferences of the first to seventh lens group holding tubes 35 and 42 to 47 and on the side facing the outer circumference of the cam tube 51. The guide tube 52 supports the cam tube 51 rotatably around the optical axis X. The zooming ring 53 is disposed on the side facing the outer circumference of a front portion of the guide tube 52. The zooming ring 53 is so supported by the guide tube 52 as to be rotatable around the optical axis X. The first to seventh lens group holding tubes 35 and 42 to 47, the cam tube 51, the guide tube 52, and the zooming ring 53 are each a resin molded part.

The cam tube 51 has five cam holes 54 arranged in the optical axis direction X and at each of three locations separated from each other at equal angular intervals around the optical axis X, as shown in FIG. 4. The cam holes 54 each incline with respect to the optical axis X along the circumferential direction. The guide pins 49 on the second to six lens group holding tubes 42 to 46, which hold the movable lens groups, pass through the five cam holes 54. The second to six lens group holding tubes 42 to 46 are so supported by the cam tube 51 as to be movable in the optical axis direction X.

The guide tube 52 includes a tube main body 55 and a flange 32, which protrudes outward from the tube main body 55. A female thread 56 is provided on the inner circumferential surface of a front end portion of the tube main body 55. The male thread 38 of the first lens group holding tube 35 engages with the female thread 56 so that the first lens group holding tube 35 is held by the guide tube 52. The female thread 56 of the guide tube 52 and the male thread 38 of the first lens group holding tube 35 form a helicoid mechanism 57, which moves the first lens group LG1 in the optical axis direction X at the time of focusing, as shown in FIG. 5. A rear-end portion of the tube main body 55 forms a small diameter tubular section 58 having an outer diameter smaller than that of a front portion of the tubular main body 55. The small diameter tubular section 58 is a fixing portion for fixing the seventh lens group holding tube 47. The seventh lens group holding tube 47 is fixed to the small diameter tubular section 58 via an adhesive.

A front-end portion of the tubular main body 55 is further provided with three elongated holes 61 extending in the circumferential direction perpendicular to the optical axis X. The elongated holes 61 are provided at equal angular intervals around the optical axis X. The zooming ring 53 is disposed in a position where the zooming ring 53 covers the outer circumferences of the three elongated holes 61. The zooming ring 53 is connected to a front end portion of the cam tube 51 with fixing pins 62, which radially pass through the elongated holes 61. Therefore, when the zooming ring 53 is rotated relative to the guide tube 52, the cam tube 51 rotates integrally with the zooming ring 53. The zooming ring 53 and the cam tube 51 are rotatable over the angular range over which the fixing pins 62 move from one circumferential end of the elongated holes 61 to the other end thereof. The fixing pins 62 are each fixed to the cam tube 51 with a screw 63.

The tube main body 55 further includes three guide grooves 65, which extend in the optical axis direction X. The guide grooves 65 are provided at three locations separate from each other at equal angular intervals around the optical axis X. The guide pins 49 on the second to six lens group holding tubes 42 to 46 are so inserted into the guide groove 65 as to pass through the inner circumferences thereof. The guide grooves 65 each include penetration sections 66, which pass through a front portion and a rear portion of the guide groove 65 in the radial direction.

A method for attaching the guide pins 49 to the second to six lens group holding tubes 42 to 46 will be described. To attach the guide pins 49 to the second to six lens group holding tubes 42 to 46, the guide tube 52 and the cam tube 51 are first rotated relatively to each other around the optical axis X to cause the cam holes 54 of the cam tube 51 and the penetration sections 66 of the guide tube 52 to communicate with each other in the radial direction. The guide pins 49 are then inserted from the side facing the outer circumference of the guide tube 52 into the penetration sections 66 and the cam holes 54. The guide pins 49 are then fixed to pin fixing portions of the lens group holding tubes 42 to 46 with the screws 50. The pin fixing portions are located on the side facing the inner circumference of the cam tube 51. In this process, when the guide pins 49 are fixed to the lens group holding tubes 42 to 46, the outer-circumference-side ends of the guide pins 49, which pass through the cam holes 54 and extend beyond the outer circumference of the cam tube 51, are separate from the bottom surfaces of the guide grooves 65 toward the inner circumferences thereof.

The flange 32 is provided on the guide tube 52 and in a halfway position in the optical axis direction X. The flange 32 is formed in a position shifted from the rearmost cam hole 54 (5), which is located in a position closest to the rear side X2 (reduction side) among the plurality of cam holes 54 provided in the cam tube 51, toward the front side X1 (enlargement side). The position of the flange 32 is therefore closer to the center of gravity G of the projection lens 3 than the front and rear ends of the barrel 31. Further, the position of the flange 32 is therefore closer to the center of gravity G than the cam hole 54 (5). In the present example, the flange 32 is located in position shifted from the center of gravity G of the projection lens 3 toward the rear side X2. Further, the flange 32 is provided in a position different from the positions of the penetration sections 66 of the guide groove 65 in the optical axis direction X. That is, the flange 32 is located in a position between the penetration sections 66 provided in the front portions of the guide grooves 65 and the penetration sections 66 provided in the rear portions thereof in the optical axis direction X. It is noted that the center of gravity G of the projection lens 3 moves in the optical axis direction X when the movable lens groups move at the time of zooming.

The contour of the guide tube 52 has a circular shape when the guide tube 52 is viewed in the optical axis direction X, and the contour of the flange 32 has a rectangular shape when the flange 32 is viewed in the optical axis direction X, as shown in FIGS. 2 and 3. Four corner sections 68 of the flange 32 having the rectangular contour are provided with fixing holes 69, which pass through the flange 32 in the optical axis direction X. The corner sections 68 of the flange 32 are disposed in angular positions around the optical axis X different from the angular positions of the guide grooves 65. The fixing holes 69 of the flange 32 and the penetration sections 66 of the guide grooves 65 are therefore provided in different angular positions around the optical axis X.

The projection lens 3 is fixed to the opening edge portion of the opening 27 of the frame 26, as shown in FIGS. 1 and 5. That is, the projection lens 3 is so postured that the rear portion of the projection lens 3 beyond the flange 32 is inserted into the opening 27 and the flange 32 is in contact with the opening edge portion of the frame 26. The fixing holes 69 in the flange 32 are then used to fix the projection lens 3 to the frame 26 with screws.

To change the magnification of an image projected by the projector 1, the zooming ring 53 is rotated. When the zooming ring 53 is rotated, the cam tube 51 rotates integrally with the zooming ring 53. When the cam tube 51 is rotated, the second to six lens group holding tubes 42 to 46, which have cam holes 54 into which the guide pins 49 have been inserted, attempt to rotate around the optical axis X integrally with the cam tube 51. It is noted that the outer-circumferential-side end portions of the guide pins 49 have been inserted into the guide groove 65 of the guide tube 52. As a result, the second to six lens group holding tubes 42 to 46 move in the optical axis direction X along the cam holes 54 and the guide tube 52. Therefore, when the zooming ring 53 is rotated, the movable lens groups (second lens group LG2, third lens group LG3, fourth lens group LG4, fifth lens group LG5, and sixth lens group LG6) held by the second to six lens group holding tubes 42 to 46 move in the optical axis direction X to change the projection magnification.

To bring an image projected by the projector 1 into focus, the first lens group holding tube 35 is rotated. It is noted that the male thread 38 of the first lens group holding tube 35 and the female thread 56 of the guide tube 53 form the helicoid mechanism 57. Therefore, when the first lens group holding tube 35 is rotated, the first lens group LG1 moves along with the first lens group holding tube 35 in the optical axis direction X. The focusing can thus be performed.

Advantageous Effects

In the projection lens 3 in the present example, the guide tube 52, which forms the barrel 31, is directly provided with the flange 32. Therefore, when the projection lens 3 is fixed to the frame 26 of the projector 1 via the flange 32, and impact externally acts on the projection lens 3, the barrel 31 can receive the impact. The projection lens 3 can therefore be more resistant to external impact than in a case where a member including the flange 32 is provided separately from the barrel 31 and the projection lens so configured that the member supports the barrel 31 in the form of a cantilever is fixed to the frame of the projector 1. Further, since the barrel 31 (guide tube 52) is directly provided with the flange 32, no member including the flange 32 needs to be disposed on the side facing the outer circumference of the barrel 31 (guide tube 52). An increase in the radial size of the projection lens 3 can therefore be avoided. Moreover, since no member including the flange 32 needs to be provided separately from the barrel 31, the number of parts of the projection lens 3 can be reduced.

The flange 32 is provided on the guide tube 52 and in a halfway position in the optical axis direction X. The flange 32 can therefore be readily provided in a position close to the center of gravity G of the projection lens 3. Further, since the position of the flange 32 is close to the center of gravity G of the projection lens 3, the projection lens3, when it is fixed to the frame 26 of the projector 1 via the flange 32, is supported by the frame 26 in a well-balanced manner.

Further, in the present example, the guide grooves 65 provided in the guide tube 52 each include the penetration sections 66, which extend over part of the guide groove 65 in the optical axis direction X and pass through the guide groove 65 in the radial direction. The guide pins 49 are therefore readily attached to the second to six lens group holding tubes 42 to 46, which hold the movable lens groups. Moreover, it is easy to achieve the state in which the guide pins 49 attached to the second to six lens group holding tubes 42 to 46 pass through the cam holes 54 in the cam tube 51 and are inserted into the guide grooves 65 in the guide tube 52.

Further, in the present example, the flange 32 and the penetration sections 66 are provided in different positions in the optical axis direction X in the guide tube 52. Moreover, in the guide tube 52, the fixing holes 69 in the flange 32 and the penetration sections 66 are provided in different angular positions around the optical axis X. It is therefore easy to fill a die with a resin to mold the guide tube 52. That is, to provide the flange 32 of the guide tube 52 with the fixing holes 69, the die needs to include pins for forming the fixing holes 69, and a movable die for the fixing holes that is movable in the optical axis direction X (axial direction of guide tube 52) needs to be provided. Further, to provide the guide tube 52 with the penetration sections 66, which pass through the guide tube 52 in the radial direction, protrusions for forming the penetration sections 66 need to be provided, and a movable die for the penetration sections that is movable in the radial direction needs to be provided. In this situation, providing the flange 32 and the penetration sections 66 in different positions in the optical axis direction X and providing the fixing holes 69 and the penetration sections 66 in different angular positions around the optical axis X can prevent interference between the movable die of the fixing holes and the movable die for the penetration sections when the two dies are moved. The guide tube 52 can therefore be readily molded.

In the projector 1 in the present example, the barrel 31 (guide tube 52) of the projection lens 3 is directly provided with the flange 32 of the projection lens 3. Therefore, when the projection lens 3 is fixed to the frame 26 of the projector via the flange 32, and impact externally acts on the projection lens 3, the barrel 31 can receive the impact. The projection lens 3 can therefore be resistant to external impact. Further, since the barrel 31 (guide tube 52) is directly provided with the flange 32, no member including the flange needs to be disposed on the side facing the outer circumference of the barrel 31. An increase in the radial size of the projection lens 3 can therefore be avoided. The space where the projection lens 3 is disposed in the projector 1 can therefore be reduced. The size of the projector 1 can therefore be readily reduced. Moreover, since no member including the flange 32 needs to be provided separately from the barrel 31, the number of parts of the projection lens 3 can be reduced. The number of parts of the projector 1 can therefore be reduced, whereby the cost required to manufacture the projector 1 can be reduced.

The entire disclosure of Japanese Patent Application No. 2018-013832, filed on Jan. 30, 2018 is expressly incorporated by reference herein.

What is claimed is:

1. A projection lens comprising:
a lens group holding tube including one or more lenses on a side facing an inner circumference of the lens group holding tube;
a cam tube that supports the lens group holding tube movably in a direction of an optical axis of the one or more lenses in such a way that an outer circumference of the lens group holding tube is supported; and
a guide tube that supports the cam tube rotatably around the optical axis in such a way that an outer circumference of the cam tube is supported, wherein:
the lens group holding tube includes a guide pin that protrudes outward from the lens group holding tube,
the cam tube has a cam hole which inclines with respect to the optical axis direction along a circumferential direction and through which the guide pin passes,
the guide tube includes a guide groove which extends in the optical axis direction, the guide groove provided in an inner circumferential surface of the guide tube and into which the guide pin is so inserted as to pass through an inner circumference of the guide groove and a flange that protrudes outward,
the guide groove includes a penetration section that extends over part of the guide groove in the optical axis direction and passes through the guide groove in a radial direction,
the flange has a fixing hole that passes therethrough in the optical axis direction, and
the flange and the penetration section are provided in different positions in the optical axis direction.

2. The projection lens according to claim 1, wherein the flange is provided on the guide tube and located in an intermediate position in the optical axis direction.

3. The projection lens according to claim 1,
wherein the guide tube is a resin molded part, and
the fixing hole and the penetration section are provided in different angular positions around the optical axis.

4. A projector comprising:
the projection lens according to claim 1; and
a frame for supporting the projection lens,
wherein the projection lens is fixed to the frame via the flange.

5. A projector comprising:
the projection lens according to claim 2; and
a frame for supporting the projection lens,
wherein the projection lens is fixed to the frame via the flange.

6. A projector comprising:
the projection lens according to claim 3; and
a frame for supporting the projection lens,
wherein the projection lens is fixed to the frame via the flange.

* * * * *